Oct. 12, 1948.  J. J. DE CARLI  2,451,075
MILK RECEIVER FOR AUTOMATIC MILKING SYSTEMS
Filed June 28, 1943
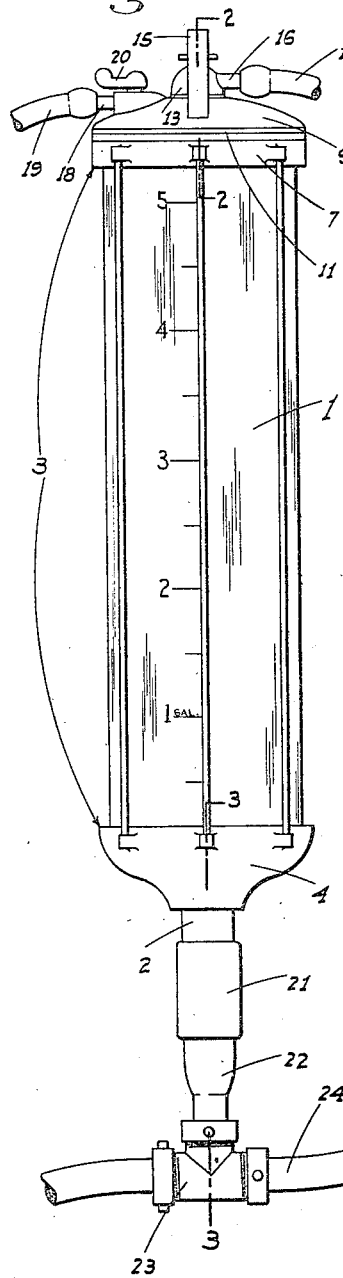
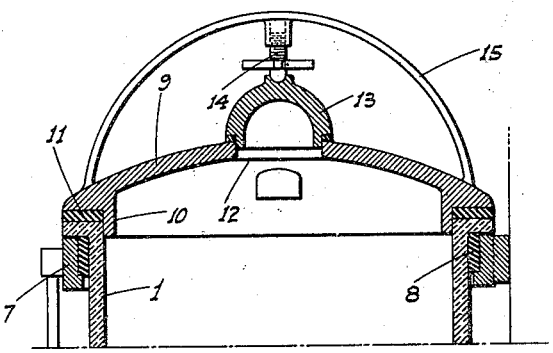
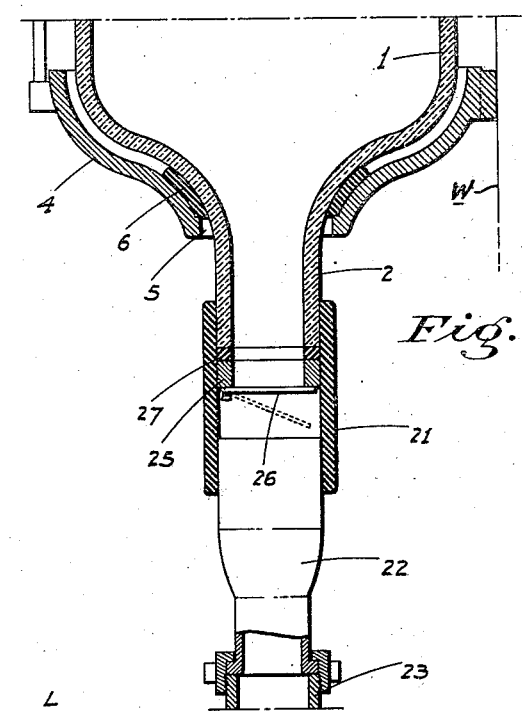
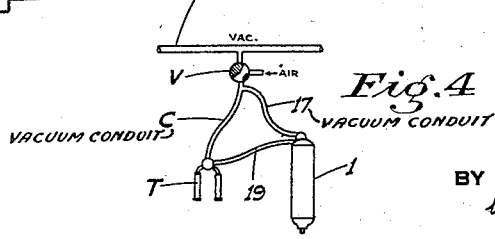
INVENTOR
John J. DeCarli
BY
Webster & Webster
ATTYS Patented Oct. 12, 1948

2,451,075

UNITED STATES PATENT OFFICE 2,451,075

MILK RECEIVER FOR AUTOMATIC MILKING SYSTEMS

John J. De Carli, Stockton, Calif.

Application June 28, 1943, Serial No. 492,487

4 Claims. (Cl. 31—82)

This invention relates in general to improvements in a milking system which includes a plurality of automatic milking assemblies, and in particular the invention is directed to, and it is an object to provide, a milking system in which the milk flows from the teat cup unit of each milking assembly to a separate transparent receiver or container; the milk from each cow flowing to and being retained in the corresponding receiver until the milking of such cow is complete, so that the operator can note the quantity obtained from such cow, and thereafter the milk is released from said receiver and flows by gravity to a common tank from which the milk is withdrawn for processing and transport from the dairy.

An additional object of the present invention is to provide a milking system as above, wherein the milk from the transparent receiver is automatically released when the operator shuts off the vacuum conduit leading to the teat cup unit preparatory to removing the latter from the cow. The shutting off of said vacuum conduit results in relief of the vacuum in the milk receiver, which in turn causes automatic opening of a vacuum closed valve disposed in an outlet conduit leading from the bottom of the receiver, whereupon the milk flows from the receiver through said outlet conduit into a gravity feed carry-off pipe.

A further object of this invention is to provide a milk receiver and valve assembly for use in a milking system in the manner described, which assembly comprises a vertically elongated transparent receiver fitted at its upper end with a head and to which head the vacuum and milk flow conduits of the milking assembly are connected, and arranged at its lower end with a valve assembly which includes a downwardly opening flap valve which closes under the influence of vacuum in the receiver, and opens by the pressure or the milk in the receiver when the vacuum therein is relieved; said valve assembly being connected at its lower end with a gravity feed carry-off pipe.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the milk receiver and valve assembly.

Figure 2 is a fragmentary enlarged transverse section on line 2—2 of Fig. 1.

Figure 3 is a fragmentary enlarged transverse section on line 3—3 of Fig. 1.

Figure 4 is a fragmentary diagram showing the preferred conduit arrangement between the vacuum line and the teat cup unit and receiver.

Referring now more particularly to the characters of reference on the drawings, the numeral 1 indicates a vertical and elongated receiver or container of glass or other similar material, said receiver being initially open at its upper end and reducing in diameter at its lower end to a depending neck 2 of substantial length. This receiver 1 is supported within a cage indicated generally at 3, which includes an upwardly facing concave bottom 4 having a central opening 5 through which the neck 2 of the receiver projects. An annular protective gasket 6 engages between the receiver and the bottom 4. At its upper end the cage includes a ring 7 surrounding the corresponding end of the receiver 1 in laterally stabilizing relation thereto, another protective gasket 8 being disposed between the ring 7 and the adjacent upper end portion of said receiver. The elements 4 and 7 of the cage 3 are supported from a fixed structure such as a wall W or the like, as shown in Fig. 2.

A circular head 9 normally removably seats in closing relation on the upper end of the receiver 1, being retained in place laterally by a depending annular locating flange 10. A sealing gasket 11 assures of vacuum-tight connection between the head 9 and receiver 1.

The head 9 is formed with a central or top opening 12 normally closed by a relatively small removable dome 13 held in place by a finger screw 14 which engages between a fixed bail 15 on the head and the upper end of said dome. A fitting or nipple 16 is mounted on and communicates with the interior of said dome, said fitting exteriorly of the dome being connected with a vacuum conduit 17. As indicated in Fig. 4, this conduit connects with a vacuum conduit C leading from the main vacuum line L of the milking system to a teat cup unit T to actuate the latter. The vacuum in conduit C is controlled during each milking operation by a pulsator (not shown), but which is of conventional type. A suitable three-way valve V is interposed in conduit C between line L and conduit 17, so that vacuum to conduits C and 17 may be shut off while air from atmosphere is admitted thereto, and vice versa.

Another fitting 18 leads through the head 9 as shown, and such fitting, exteriorly of the head, is connected with a flexible milk-flow conduit 19 leading from the teat cup unit T. A hand valve 20 controls flow from conduit 19 into the receiver, although valve 20 is normally open.

The head 9 is similar to that now used in connection with milking machines, and is arranged in communication with the vacuum conduit 17 and milk flow conduit 19 leading from the teat cup unit as described. In conventional milking machines, however, the head 9 seats on a metal milk receiving bucket which, when full, the operator must detach from the head and carry to a point of emptying. In the present invention the milk is drawn into the transparent receiver 1 through the milk conduit 19, and under the influence of vacuum in said receiver created from conduit 17; the milk remaining in said receiver until the milking of each cow is completed, and then being automatically released and discharged from said receiver without moving the latter. This is accomplished by the following mechanism:

An elongated sleeve 21 of relatively stiff but resilient and somewhat flexible material, such as rubber, is frictionally engaged about the neck 2 adjacent its lower end, and the sleeve depends some distance below the lower end of said neck. A tubular stub conduit 22 frictionally engages in the lower end of sleeve 21, adjacent ends of the neck 2 and conduit 22 being in substantially vertical alinement and spaced apart as shown. At its lower end the conduit 22 is connected in removable relation with a T fitting 23 interposed in a gravity feed carry-off pipe 24 which leads to a common milk receiving tank (not shown). The milking system will preferably include a plurality of milk receiving and valve assemblies, and each discharges into the gravity feed carry-off pipe 24, which is the reason for the use of a T fitting 23 interposed in said pipe.

In the sleeve 21 between the adjacent ends of neck 2 and conduit 22 I interpose a valve mechanism which includes a relatively rigid valve-seat forming collar 25 frictionally but removably engaged within said sleeve; said collar having a downwardly opening flap valve 26 hinged on the lower end thereof. The hinge structure for this valve 26 is such as to preferably limit its downward movement to substantially that shown by dotted lines in Fig. 3, and in no event to allow it to swing to any point approximating vertical position. An annular gasket 27 frictionally and removably engages between the collar 25 and the adjacent end of neck 2.

When the operator opens the conduit 17 and vacuum is created in receiver 1, as well as in milk flow conduit 19, the flap valve 26 is forcefully closed under the influence of such vacuum. Thereafter during the milking operation, and while the milk is flowing from the teat cup unit through conduit 19 into transparent receiver 1, said flap valve 26 remains closed and prevents escape of any of the milk from said receiver. Thus, when the milking of a cow is completed, the operator, by glancing at the transparent receiver 1 which is scaled in gallons as shown, can determine and note the exact amount of milk which has been obtained. After noting this fact the operator, preparatory to removing the teat cup unit from the cow, closes the conduit 17 to vacuum and admits air thereto by manipulation of valve V, which results in relief of the vacuum in the receiver 1 and said teat cup unit.

When the vacuum in said receiver is relieved, the flap valve 26, due to the weight or pressure of the milk thereagainst, swings downwardly to open position, as shown in dotted lines in Fig. 3, whereupon the milk flows from receiver 1, past valve 26, through conduit 22 and into the gravity feed carry-off pipe 24.

With re-establishment of vacuum in receiver 1, which takes place when the teat cup unit is placed on the next cow and the vacuum conduit 17 opened, the cycle is repeated.

With my improved milking system, and particularly by virtue of the described milk receiver and valve assembly, the exact amount of milk obtained from each cow is known, the milking of a cow can be accomplished with greater facility and speed than heretofore possible, and the milk is maintained under very sanitary conditions.

As is apparent, the entire milk receiver and valve assembly can be easily dismantled for cleaning and sterilization.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a vacuum milking apparatus, a closed milk receiver constructed at its upper end for connection with separate sources of vacuum and milk, a milk outlet neck on the lower end of the receiver, an outlet conduit depending from the neck and including a relatively stiff but resilient sleeve removably engaging over the neck in frictional contact therewith, and a downwardly opening flap valve unit mounted in the removable sleeve and held therein solely by frictional contact with the inner surface of such sleeve.

2. Apparatus as in claim 1, in which said valve unit includes a flap supporting and seat forming collar.

3. In a vacuum milking apparatus, a closed milk receiver, means supporting the receiver in a fixed position, an outlet neck depending from the receiver, a milk-flow line below the receiver, a fitting in said line having an upstanding intake element vertically alined with the neck, a conduit unit connecting said neck and element and comprising a lower rigid section having means to releasably couple the same onto said element and an upper flexible section detachably engaging over the neck, and a downwardly opening valve removably mounted in the flexible section below the neck.

4. In a milking apparatus, a milk receiving unit comprising a fixed support which includes a pair of vertically spaced apart rings, a substantially concave container receiving element on the lower ring, which element is provided with a central opening, a substantially cylindrical container having a convex reduced portion on its lower end terminating in a depending neck, the reduced portion being seated and supported on the concave receiving element with the said neck projecting through the central opening in said element, an outwardly projecting annular flange about the upper end of the container, such flange overhanging and being supported by the upper ring, and a cap removably seated on the flange and having fittings for connection with separate sources of vacuum and milk.

JOHN J. DE CARLI.

REFERENCES CITED

The following references are of record in the file of this patent:

UNITED STATES PATENTS

| Number | Name | Date |
|---|---|---|
| 261,385 | Roelofs | July 18, 1882 |
| 367,953 | Bowman | Aug. 9, 1887 |
| 516,600 | Higgins | Mar. 13, 1894 |
| 519,387 | Michael | May 8, 1894 |
| 1,064,489 | Kennedy | June 10, 1913 |
| 1,189,468 | Miller | July 4, 1916 |
| 1,259,084 | Devore | Mar. 12, 1918 |
| 1,846,805 | Hapgood | Feb. 23, 1932 |
| 1,854,304 | Hapgood | Apr. 19, 1932 |
| 1,977,511 | Graves | Oct. 16, 1934 |
| 1,978,941 | Hapgood | Oct. 30, 1934 |

FOREIGN PATENTS

| Number | Country | Date |
|---|---|---|
| 497,014 | Great Britain | Dec. 9, 1938 |